(12) United States Patent
Ezrielev et al.

(10) Patent No.: US 12,242,447 B2
(45) Date of Patent: Mar. 4, 2025

(54) MONITORING OPERATION OF A DATA PIPELINE TO OBTAIN REPRESENTATIONS OF OPERATION QUALITY

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/343,925

(22) Filed: Jun. 29, 2023

(65) Prior Publication Data

US 2025/0005005 A1    Jan. 2, 2025

(51) Int. Cl.
*G06F 16/00* (2019.01)
*G06F 16/21* (2019.01)

(52) U.S. Cl.
CPC .................................. *G06F 16/217* (2019.01)

(58) Field of Classification Search
None
See application file for complete search history.

(56) References Cited

U.S. PATENT DOCUMENTS

| | | |
|---|---|---|
| 7,315,805 B2 | 1/2008 | Slater |
| 10,168,691 B2 | 1/2019 | Zornio et al. |
| 10,936,479 B2 | 3/2021 | Maag et al. |
| 11,101,037 B2 | 8/2021 | Allen |
| 11,221,270 B2 * | 1/2022 | Evans ..................... G01M 3/28 |
| 11,341,605 B1 | 5/2022 | Singh |
| 11,853,853 B1 | 12/2023 | Beauchesne et al. |
| 12,008,046 B1 | 6/2024 | Curtis et al. |
| 2004/0064750 A1 * | 4/2004 | Conway ............. G01R 19/2516 |
| | | 713/401 |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Hasanul Mobin
(74) *Attorney, Agent, or Firm* — Womble Bond Dickinson (US) LLP

(57) ABSTRACT

Methods and systems for managing operation of a data pipeline are disclosed. To manage the operation, a system may include one or more data sources, a data manager, and one or more downstream consumers. Interruptions to the operation may impact provision of data processing services by the data pipeline and may cause the data processing services to no longer align with operation quality goals for the data pipeline. To maintain compliance with the operation quality goals, the operation may be monitored over time. Operation data may be obtained for the data pipeline and may be used to determine representations of operation quality of the data pipeline. The representations of operation quality of the data pipeline may be compared to the operation quality goals and actions may be performed to remediate differences between the representations of operation quality of the data pipeline and the operation quality goals.

20 Claims, 4 Drawing Sheets

(56) References Cited

U.S. PATENT DOCUMENTS

| | | | |
|---|---|---|---|
| 2006/0009881 A1* | 1/2006 | Ferber | G05D 7/0647 |
| | | | 700/282 |
| 2014/0037161 A1* | 2/2014 | Rucker | G06T 7/344 |
| | | | 382/128 |
| 2014/0136184 A1 | 5/2014 | Hatsek | |
| 2016/0098037 A1* | 4/2016 | Zornio | H04L 43/045 |
| | | | 700/20 |
| 2018/0081871 A1 | 3/2018 | Williams | |
| 2019/0034430 A1 | 1/2019 | Das | |
| 2019/0236204 A1 | 8/2019 | Canim | |
| 2020/0166558 A1* | 5/2020 | Weis | H02H 7/26 |
| 2020/0167224 A1 | 5/2020 | Abali | |
| 2020/0202478 A1* | 6/2020 | Thumpudi | G06T 5/80 |
| 2020/0293684 A1 | 9/2020 | Harris | |
| 2021/0027771 A1 | 1/2021 | Hall | |
| 2021/0116505 A1 | 4/2021 | Shu | |
| 2021/0374143 A1 | 12/2021 | Neill | |
| 2021/0406110 A1 | 12/2021 | Vaid et al. | |
| 2022/0092234 A1 | 3/2022 | Karri | |
| 2022/0301027 A1 | 9/2022 | Basta | |
| 2022/0310276 A1* | 9/2022 | Wilkinson | G06F 16/254 |
| 2023/0040834 A1* | 2/2023 | Haile | G06F 16/2365 |
| 2023/0126260 A1 | 4/2023 | Elsakhawy et al. | |
| 2023/0153095 A1* | 5/2023 | Rahill-Marier | G06F 8/71 |
| | | | 717/169 |
| 2023/0213930 A1 | 7/2023 | Rakshit | |
| 2023/0315078 A1* | 10/2023 | Sepulveda | G05B 23/0289 |
| 2023/0418280 A1* | 12/2023 | Emery | G05B 23/0283 |
| 2024/0235952 A9 | 7/2024 | Hicks | |
| 2024/0281419 A1 | 8/2024 | Alfaras | |
| 2024/0330136 A1 | 10/2024 | Furlong | |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

\* cited by examiner

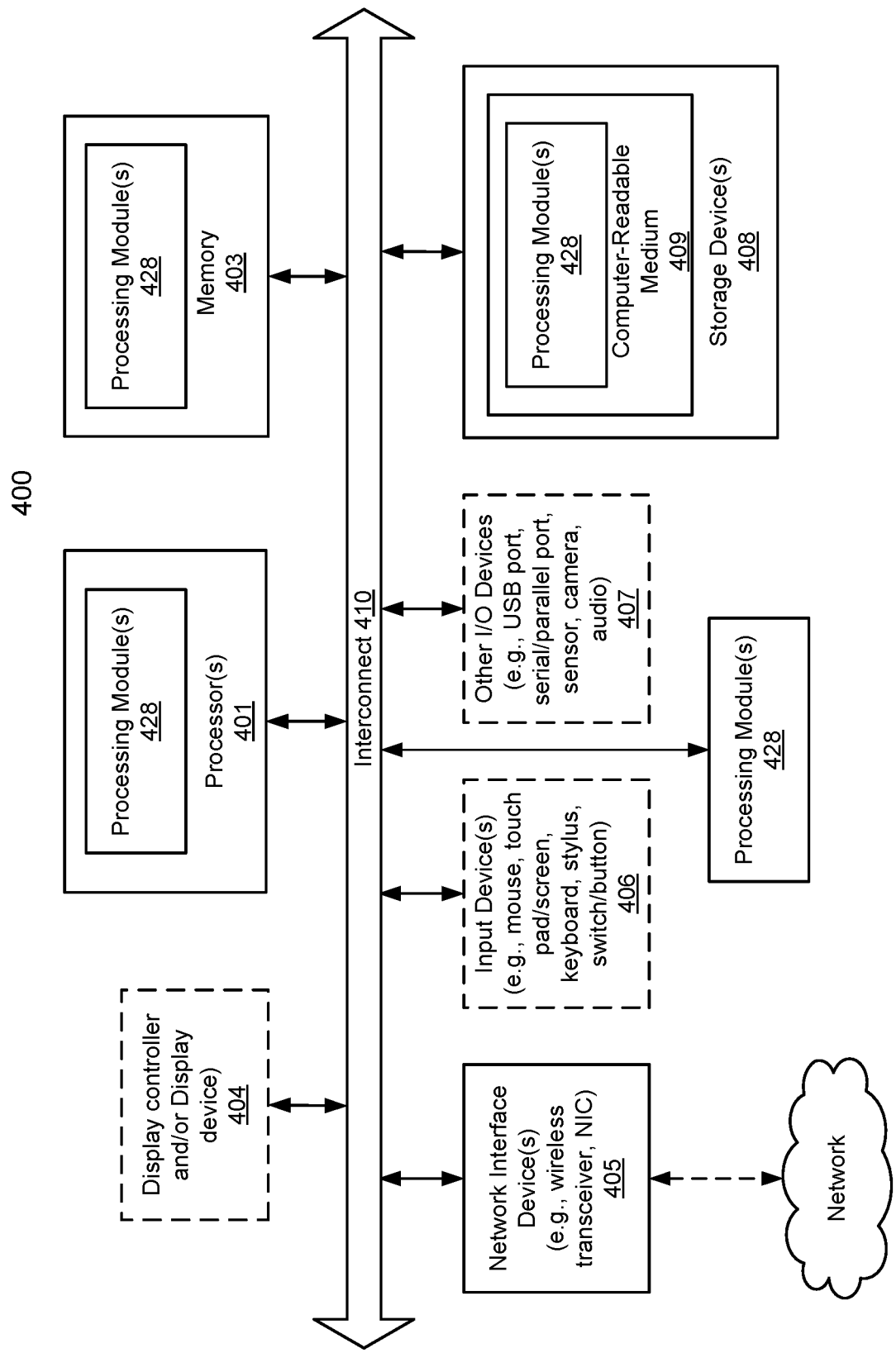

MONITORING OPERATION OF A DATA PIPELINE TO OBTAIN REPRESENTATIONS OF OPERATION QUALITY

FIELD

Embodiments disclosed herein relate generally to data management. More particularly, embodiments disclosed herein relate to systems and methods to manage data using data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 4 shows a block diagram illustrating a data processing system in accordance with an embodiment.

DETAILED DESCRIPTION

Figure 1:
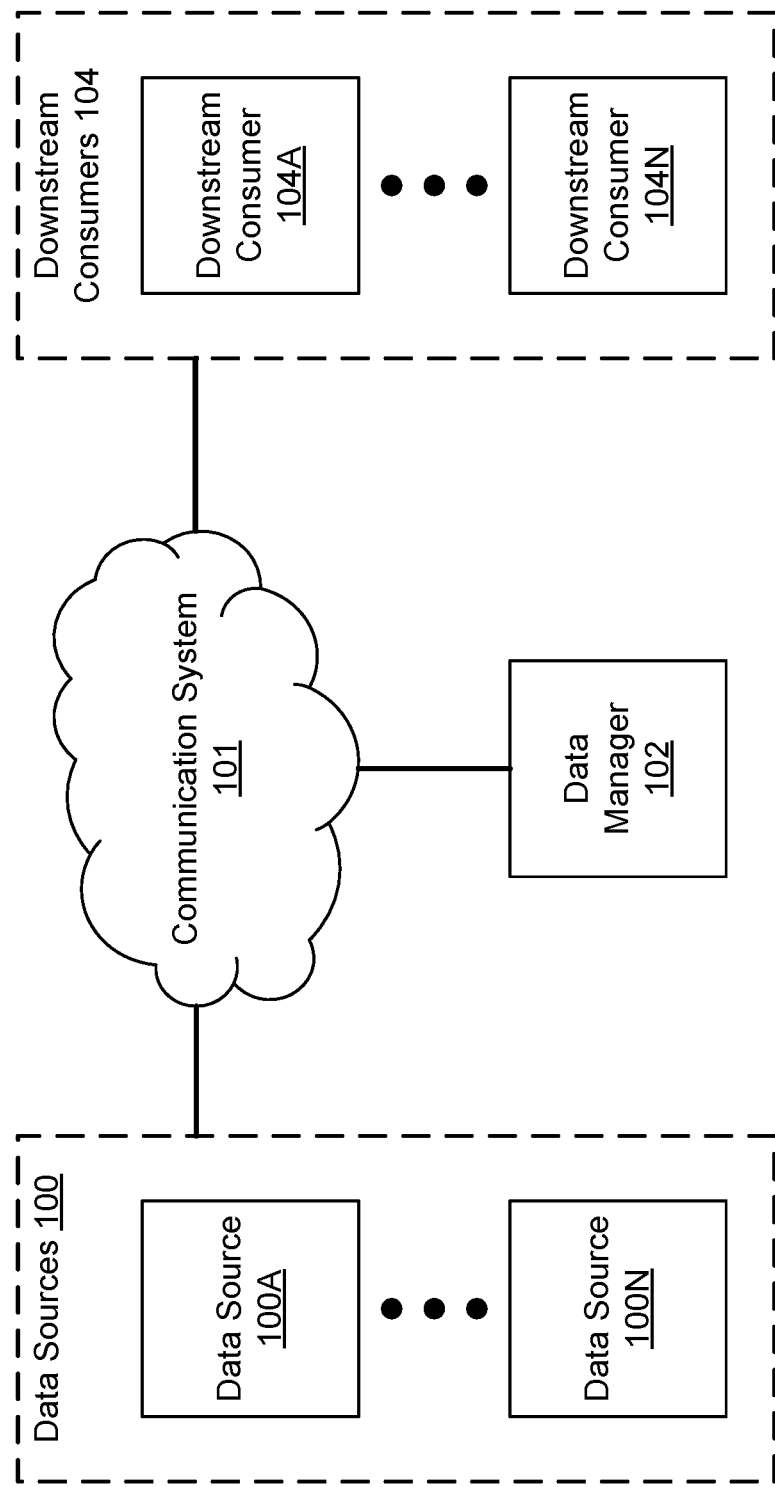
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data pipelines. Data usable by a data pipeline may be obtained from any number of data sources. Data pipelines may provide data processing services (e.g., computer-implemented services) based, at least in part, on the data. The data processing services may include: (i) requesting data from any number of data sources, (ii) curating the data using any number of methods, (iii) providing the data to any number of downstream consumers associated with the data pipeline, and/or (iv) other services.

During operation of the data pipeline (and/or during provision of the data processing services), the data pipeline may experience downtime (e.g., cessation of the data processing services), may experience occurrences of misalignments (e.g., unexpected data and/or a lack of data provided by the data pipeline), may encounter changes to systems of representation of information (e.g., formatting changes, schema changes, etc.) conveyed by the data used by the data pipeline, and/or may encounter other events that may impact operation of the data pipeline.

Entities participating in and/or receiving the data processing services (e.g., downstream consumers and/or other entities) may expect the data pipeline to operate according to certain parameters (e.g., to achieve desired outcomes of the data processing services, to experience a desired availability of the data processing services, etc.). If the parameters are not met, provision of the data processing services may be interrupted, a quality of the data processing services may be negatively impacted, and/or the recipient of the data processing services may otherwise no longer be able to rely on the data processing services.

The operation quality of the data pipeline (based on factors such as uptime of the data pipeline, a number of occurrences of misalignments of the data pipeline, etc.) may change over time (e.g., due to modifications to one or more data sources which may impact data supplied by the one or more data sources and, therefore, increase occurrences of misalignments of the data pipeline over time, etc.). To maintain alignment between the operation quality of the data pipeline and operation quality goals for the data pipeline, the operation of the data pipeline may be monitored over time.

The operation of the data pipeline may be monitored according to monitoring criteria, the monitoring criteria indicating types of data to be collected about the data pipeline, frequencies of data collection for the types of the data to be collected about the data pipeline, etc. Operational data may be obtained for the data pipeline and may be used to determine representations of operation quality for the data pipeline. The representations of operation quality (e.g., an operation quality score, etc.) may be generated by comparing the operation data to evaluation metrics (e.g., schemas for ascribing value to different portions of the operational data). The representations of operation quality may then be compared to operation quality goals to determine whether a current operation quality of the data pipeline meets the operation quality goals (e.g., indicated by a downstream consumer and/or other entity).

An action set may be performed based on a degree to which the operation quality of the data pipeline meets the operation quality goals for the data pipeline. By doing so, the system may efficiently respond to occurrences of misalignment between the operation quality of the data pipeline and the operation quality goals for the data pipeline. Consequently, future incidents of unsatisfactory and/or reduced quality provision of data processing services by the data pipeline may be reduced (and/or swiftly remediated). Therefore, and users (e.g., receivers of the data processing services) associated with the data pipeline may more reliably receive the data processing services based on data managed by the data pipeline.

In an embodiment, a method of managing a data pipeline is provided. The method may include: monitoring the data pipeline based on monitoring criteria to obtain operation data for the data pipeline; obtaining representations of operation quality of the data pipeline using the operation data and evaluation metrics; evaluating the representations of the operation quality of the data pipeline for compliance with operation quality goals for the data pipeline to obtain a degree of alignment with a use of the data pipeline; and performing an action set based on the degree of alignment with the use of the data pipeline to improve a quality of data processing services provided by the data pipeline.

The monitoring criteria may specify at least the following as monitored quantities: uptime of the data pipeline; occurrences of misalignments of the data pipeline; and portions of data managed by the data pipeline that are impacted by the occurrences of the misalignments.

The monitoring criteria may further specify at least the following as additional monitored quantities: re-alignments of the misalignments of the data pipeline; and durations of time between the misalignments of the data pipeline and the re-alignments of the misalignments.

The evaluation metrics may specify at least the following metrics: a threshold duration for the uptime of the data pipeline; a threshold number of occurrences for the misalignments of the data pipeline; and a value ascribed by a downstream consumer to the portions of the data.

The evaluation metrics may further specify at least the following additional metrics: a value ascribed by the downstream consumer for the durations of time.

Performing the action set may include: obtaining a report based on the degree of alignment with the use of the data pipeline; distributing the report to one or more persons to obtain user feedback; and selecting one or more actions to be performed based on the user feedback.

The one or more actions, when performed, may modify operation of the data pipeline to obtain an updated data pipeline.

Performing the action set may also include: providing the data processing services using the updated data pipeline.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Data sources 100 may include any number of internal data sources (e.g., data sources managed and curated by the system of FIG. 1) and/or external data sources (e.g., data sources managed and curated by other entities). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of personal electronic devices (e.g., desktop computers, cellphones, etc.) and/or any other devices operated by individuals to collect measurements related to computing equipment usage for individuals. Data sources 100 may be associated with a data pipeline and, therefore, may collect the measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data manager 102 may obtain the data (the computing equipment usage measurements) from data sources 100 as part of the data pipeline. Data manager 102 may obtain the data via a request through an API and/or via other methods. Data manager 102 may curate the data (e.g., identify errors/omissions and correct them, etc.) and may store the curated data temporarily and/or permanently in a data lake or other storage architecture. Following curating the data, data manager 102 may provide the data to other entities for use in performing the computer-implemented services.

Data managed by data manager 102 (e.g., stored in a data repository managed by data manager 102, etc.) may be provided to downstream consumers 104. Downstream consumers 104 may utilize the data from data sources 100 and/or data manager 102 to provide all, or a portion, of the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the computing equipment usage measurements from data manager 102 as input data for customer service models. Specifically, downstream consumers 104 may utilize the data related to an individual (e.g., a user's) past and current computing equipment needs, as well as other information about the individual, to simulate future computing equipment needs of the individual. By doing so, data processing services provided to the customer may be tailored based on projected needs of the individual.

Entities receiving the data processing services provided by the data pipeline (e.g., users) may expect the data pipeline to operate according to previously established parameters for operation quality. Interruptions to the operation of the data pipeline (e.g., downtime of the data pipeline, misalignment of the data pipeline, unusable data being supplied by the data pipeline, etc.) may negatively impact the operation quality and, therefore, may cause the operation quality of the data pipeline to no longer meet operation quality goals for the data pipeline (e.g., based on the previously established parameters, etc.).

In addition, changes may occur over time (e.g., to data sources 100, and/or any other portion of the data pipeline) that may impact the operation quality of the data pipeline (e.g., by increasing instances of misalignments of the data pipeline, etc.). The downstream effects of these changes may cause unexpected changes in the provision of the data processing services. Unexpected changes to the data processing services may result in potential changes in the availability, reliability, and/or quality of the data processing services provided to the users.

In general, embodiments disclosed herein may provide methods, systems, and/or devices for monitoring operation of a data pipeline. By monitoring the operation of the data pipeline, representations of operation quality of the data pipeline may be obtained and compared to operation quality goals for the data pipeline. By doing so, actions may be performed to remediate a difference between the operation quality of the data pipeline and the operation quality goals for the data pipeline.

To provide the above noted functionality, the system of FIG. 1 may: (i) monitor the data pipeline based on monitoring criteria to obtain operation data for the data pipeline, (ii) obtain representations of operation quality of the data pipeline using the operation data and evaluation metrics, (iii) evaluate the representations of the operation quality of the data pipeline for compliance with operation quality goals for the data pipeline to obtain a degree of alignment with a use of the data pipeline, and/or (iv) perform an action set based on the degree of alignment with the use of the data pipeline to improve a quality of the data processing services provided by the data pipeline.

The monitoring criteria may indicate how the operation of the data pipeline may be monitored. For example, the monitored quantities may include: (i) uptime of the data pipeline, (ii) occurrences of misalignments of the data pipeline, (iii) portions of the data managed by the data pipeline that are impacted by the occurrences of the misalignments, (iv) re-alignments of the misalignments of the data pipeline, (v) durations of time between the misalignments of the data pipeline and the re-alignments of the misalignments, and/or (vi) other quantities. The operation data may be obtained (e.g., for the above mentioned monitored quantities) as indicated by any procedure for monitoring the data pipeline (e.g., at regular intervals, upon request, etc.).

To obtain the representations of operation quality for the data pipeline, the operation data may be compared to the evaluation metrics. The evaluation metrics may include schemas for interpreting (e.g., ascribing value to) different portions of the operation data.

Figure 2:
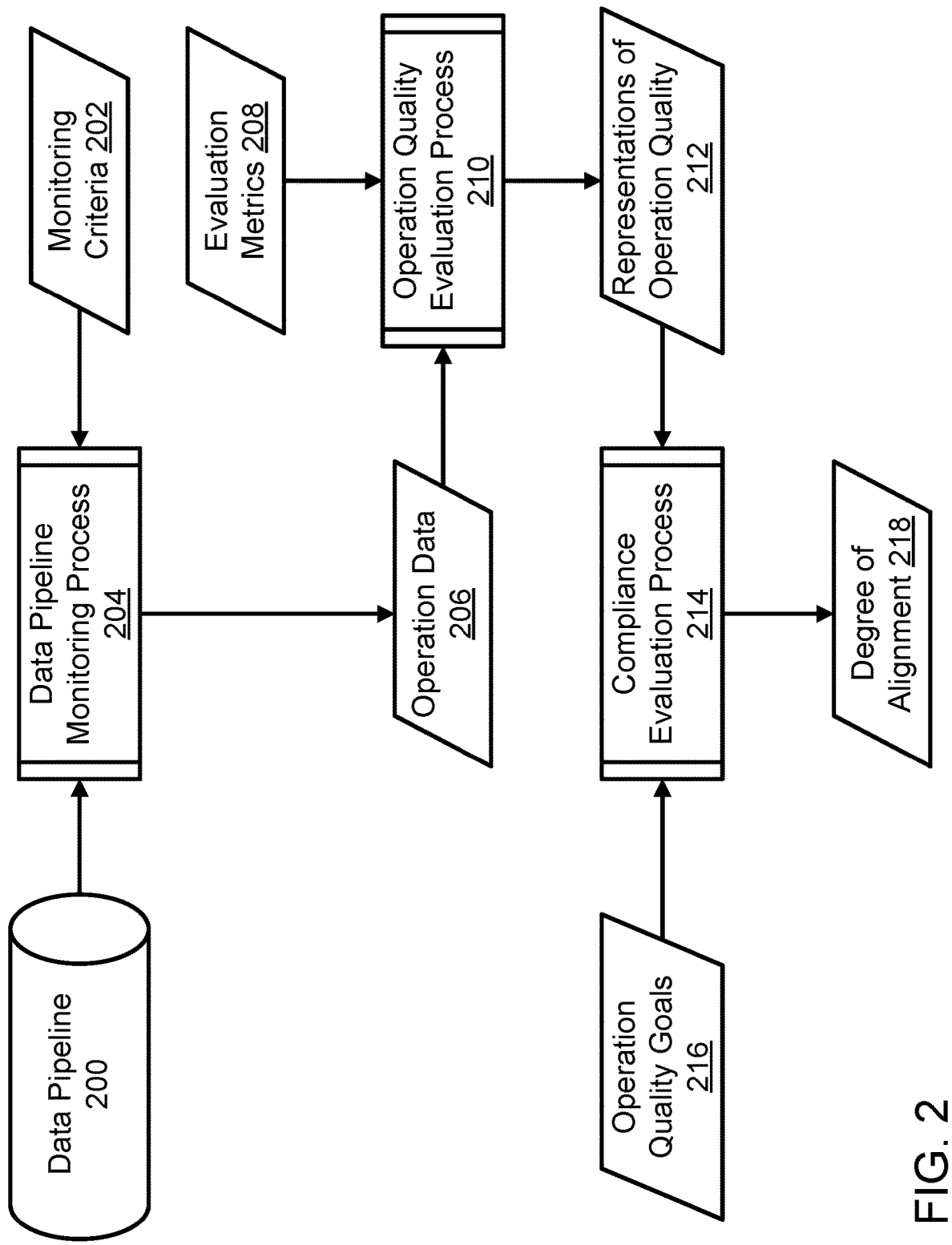
FIG. 2 shows a block diagram illustrating data flow during monitoring operation of a data pipeline in accordance with an embodiment.
Figure 3:
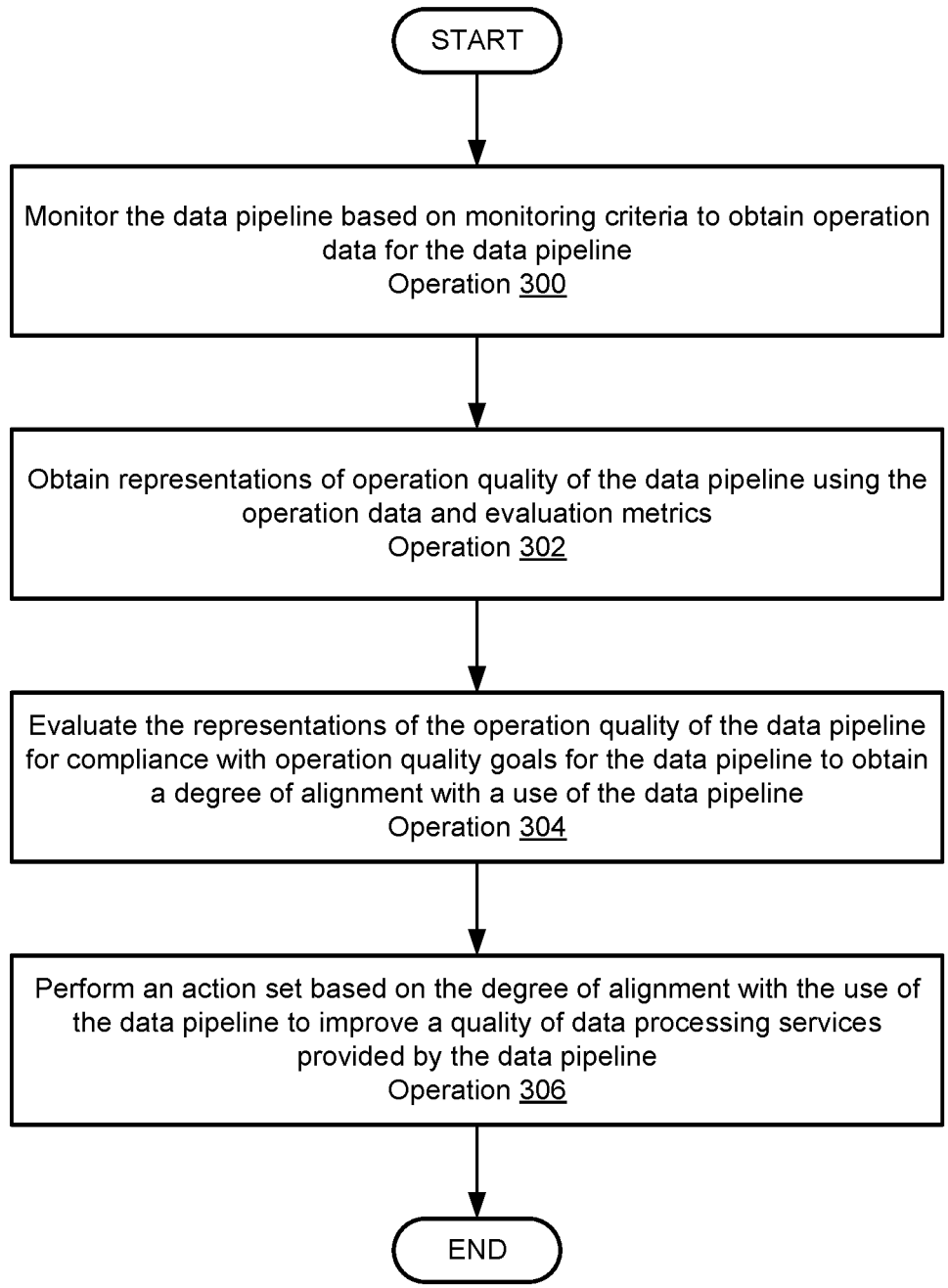
FIG. 3 shows a flow diagram illustrating a method of managing a data pipeline in accordance with an embodiment.

When performing its functionality, data sources 100, data manager 102, and/or downstream consumers 104 may perform all, or a portion, of the methods and/or actions shown in FIGS. 2-3.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIG. 2.

FIG. 2 shows a block diagram illustrating data flow during monitoring operation of a data pipeline in accordance with an embodiment. The processes shown in FIG. 2 may be performed by any entity shown in the system of FIG. 1 (e.g., a data source similar to data source 100A, a data manager similar to data manager 102, a downstream consumer similar to downstream consumer 104A, etc.) and/or another entity without departing from embodiments disclosed herein.

Data pipeline 200 may include any of the components shown in FIG. 1 and/or any number of additional components (e.g., data sources, downstream consumers, data repositories, etc. usable to perform data processing services as described in FIG. 1). Data pipeline 200 may provide data processing services based on data obtained from data sources and curated as part of the operation of data pipeline 200. Entities receiving the data processing services (e.g., users) may expect the provision of the data processing services (and, therefore, the operation of the data pipeline) to adhere to certain parameters for operation quality (e.g., operation quality goals 216).

To determine whether the operation of data pipeline 200 adheres to operation quality goals 216, data pipeline monitoring process 204 may be performed. Data pipeline monitoring process 204 may include determining methods for monitoring the operation of data pipeline 200 using monitoring criteria 202. Monitoring criteria 202 may specify at least the following as monitored quantities: (i) uptime of the data pipeline, (ii) occurrences of misalignments of the data pipeline, (iii) portions of the data managed by the data pipeline that are impacted by the occurrences of the misalignments, (iv) re-alignments of the data pipeline, (v) durations of time between the misalignments of the data pipeline and the re-alignments of the misalignments, and/or (vi) other monitored quantities.

The uptime of the data pipeline may indicate durations of time between interruptions to the operation of the data pipeline. Interruptions to the operation of the data pipeline (e.g., causing cessation of the data processing services) may be caused by unavailability of data from one or more data sources associated with data pipeline 200, misalignments of one or more APIs associated with data pipeline 200, delays in retrieving and providing data from one or more data repositories to one or more downstream consumers associated with data pipeline 200, and/or other reasons. Uptime of the data pipeline may be represented as a percentage (e.g., of functional time out of the total time) and/or may be represented in other formats.

The occurrences of misalignments of the data pipeline may include instances where no data is provided as output from one or more APIs associated with the data pipeline (e.g., a broken API), instances where incomprehensible and/or otherwise unusable data is provided as output from one or more APIs associated with the data pipeline, and/or any other instances where the output of the data pipeline is unexpected by the user (e.g., and/or other entity receiving data processing services provided by the data pipeline).

The portions of the data managed by the data pipeline that are impacted by the occurrences of the misalignments may include: (i) data not provided as a result of one or more occurrences of the misalignments, (ii) incorrect and/or otherwise unexpected data provided as a result of one or more occurrences of the misalignments, (iii) delayed data provided as a result of one or more occurrences of the misalignments, and/or (iv) other data.

The re-alignments of the misalignments of the data pipeline may include instances of re-establishing nominal function of any misaligned APIs associated with the data pipeline (e.g., via performing a self-healing operation). Re-alignments of the misalignments may occur due to: (i) modifications to one or more APIs, (ii) modifications to the data pipeline (e.g., the addition of one or more translation layers to modify a format of the data prior to inputting the data into the API and/or prior to providing the data to a downstream consumer), (iii) and/or other methods for re-establishing nominal function of the data pipeline.

The durations of time between the misalignments of the data pipeline and the re-alignments of the misalignments may indicate: (i) periods of non-nominal operation of the data pipeline, (ii) periods of cessation of provision of the data processing services by the data pipeline, and/or (iii) any other periods of time during which one or more misalignments of the data pipeline may persist.

Returning to data pipeline monitoring process 204, data pipeline monitoring process 204 may include obtaining operation data 206. Operation data 206 may include any quantity and/or format of data responsive to any number of the metrics indicated by monitoring criteria 202 (e.g., occurrences of misalignment of the data pipeline, uptime of the data pipeline, etc.). Operation data 206 may be obtained once, at regular intervals, upon request, and/or according to any schedule for monitoring the operation of data pipeline 200.

For example, operation data 206 may indicate: (i) an uptime of 72% over the previous week, (ii) three occurrences of misalignments of the data pipeline over the previous week, (iii) a list of identifiers associated with data impacted by the three occurrences of the misalignments, (iv) time stamps associated with re-alignments of the data pipeline corresponding to the three occurrences of the misalignments, (v) logs of durations of time between the occurrences of the misalignments and the re-alignments, and/or (vi) other data.

Operation data 206 may be usable for operation quality evaluation process 210. Operation quality evaluation process 210 may include comparing operation data 206 to evaluation metrics 208. Evaluation metrics 208 may specify at least the following metrics: (i) a threshold duration for the uptime (i.e., an uptime duration threshold) of the data pipeline, (ii) a threshold number of occurrences for the misalignments of the data pipeline, (iii) a value ascribed by a downstream consumer to the portions of the data, (iv) a value ascribed by the downstream consumer for the durations of time, and/or (v) other metrics.

The threshold duration for the uptime of the data pipeline may indicate, for example, a desired length of uptime, a desired percentage of uptime, and/or other representations of a duration of time. The threshold duration for the uptime of the data pipeline may be indicated by a recipient of the data processing services (e.g., a user, a downstream consumer, etc.), may be obtained prior to monitoring the operation of the data pipeline and/or may be obtained upon request as needed.

The threshold for the number of occurrences for the misalignments of the data pipeline may indicate, for example, a maximum number of occurrences of the misalignments of the data pipeline considered acceptable by a recipient of the data processing services (e.g., based on any goals and/or metrics for ascribing value to the lack of occurrences of the misalignments).

The value ascribed by the downstream consumer to the portions of the data may indicate, for example, any quantification of value to the downstream consumer (e.g., the recipient of the data processing services and/or a participant in the data processing services) for the portions of the data. Certain types of data may be more valuable (e.g., more highly impactful, more useful, etc. based on the metric for ascribing the value) than other types of data to the provision of and/or quality of the data processing services. Therefore, if a more valuable type of data is affected (e.g., missing, delayed, etc.) due to an occurrence of the misalignment, this may negatively affect the downstream consumer.

The value ascribed by the downstream consumer for the durations of time may indicate, for example, any quantification of the value to the downstream consumer (e.g., the recipient of the data processing services and/or a participant in the data processing services) for the durations of time. During the durations of time, data processing services may not be performed and/or may be performed at a reduced rate and/or with reduced-quality data due to the misalignments. Therefore, the value ascribed for the duration of time may be based on any metric for determining the impact of the duration of time on the data processing services and/or the use of the data processing services by the downstream consumer.

While described above with respect to values ascribed to portions of data and/or durations of time, similar values may be ascribed to portions of the data pipeline that provide the data, thereby allowing different portions of the data pipeline to be granularly valued with respect to downstream consumers. The similar values that may be ascribed to the portions of the data pipeline may be based on: (i) the value ascribed by the downstream consumer to the portions of the data, (ii) the value ascribed by the downstream consumer for the durations of time, (iii) the re-alignments of the misalignments, and/or (iv) any other processes impacting operation of the portion of the data pipeline.

Therefore, operation quality evaluation process 210 may include, for example, comparing the uptime of the data pipeline to the threshold for the uptime. If the uptime meets the threshold for the uptime, the uptime may be considered acceptable. If the uptime does not meet the threshold for the uptime, the uptime may be considered unacceptable.

Operation quality evaluation process 210 may include steps similar to those described above (for the threshold for the uptime) for any of evaluation metrics 208 to obtain representations of operation quality 212. Representations of operation quality 212 may include any indication, quantification, visual depiction, and/or other means of representation of the operation status of the data pipeline.

For example, a quantification included in representations of operation quality 212 may include an operation quality score, the operation quality score being calculated using a series of terms. Each term of the series of the terms may correspond to one of evaluation metrics 208 and a weight may be assigned to each of the series of the terms based on operation quality evaluation process 210. Using this operation quality score, a weight corresponding to a particular term (e.g., a term signifying the uptime of the data pipeline) may increase as the uptime of the data pipeline increases.

Representations of operation quality 212 may be utilized for compliance evaluation process 214. Compliance evaluation process 214 may include comparing representations of operation quality 212 to operation quality goals 216. Operation quality goals 216 may include any number of thresholds, ranges, and/or other goals for each of evaluation metrics 208. In addition, operation quality goals may include a macroscopic threshold for operation quality of the data pipeline (e.g., taking into account all of evaluation metrics 208 together).

Continuing with the example above in which representations of operation quality 212 include an operation quality score, operation quality goals 216 may include a threshold for the operation quality score.

Compliance evaluation process 214 may result in generation of degree of alignment 218. Degree of alignment 218 may indicate an extent to which representations of operation quality 212 meet operation quality goals 216. Degree of alignment 218 may include data related to specific portions of operation data 206 that contributed to the alignment or misalignment. Degree of alignment 218 may be provided to the downstream consumer (not shown) and based on this interaction, one or more actions may be performed if needed to improve the operation quality of the data pipeline.

The one or more actions, when performed, may modify operation of the data pipeline to obtain an updated data pipeline (not shown). The updated data pipeline may include, for example, a translation layer configured to remediate changes to systems of representations of information conveyed by data used by the data pipeline and/or other components configured to perform various remedial actions (e.g., to remediate misalignments of the data pipeline).

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of a data pipeline. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data manager, downstream consumer, and/or any other entity.

At operation 300, the data pipeline is monitored based on monitoring criteria to obtain operation data for the data pipeline. Monitoring the data pipeline may include: (i) performing a monitoring process through which the operation data is generated, (ii) providing instructions to another entity, the instructions indicating parameters (e.g., types of the operation data, a schedule for monitoring the data pipeline, etc.) for monitoring the data pipeline, (iii) requesting the operation data from another entity responsible for monitoring the data pipeline, and/or other methods.

Performing the monitoring process may include: (i) obtaining live data representative of the performance data of the data pipeline (e.g., quantifications of uptime, occurrences of misalignments of the data pipeline, etc.), (ii) aggregating the live data to generate any representations (e.g., statistical values, graphical representations, etc.) based on the live data to obtain the operation data, and/or other methods.

The live data may be obtained once, at regular intervals (e.g., once a day, once a week, etc.), and/or upon request from another entity. Aggregating the live data may include performing any analysis process using the live data (e.g., feeding the live data into an inference model or rules-based system configured to generate aggregated statistics related to the performance of the data pipeline for a duration of time).

At operation 302, representations of operation quality of the data pipeline are obtained using the operation data and evaluation metrics. Obtaining the representations of the operation quality may include: (i) comparing the operation data to the evaluation metrics, and/or (ii) providing the operation data and the evaluation metrics to another entity responsible for generating the representations of the operation quality and receiving the representations of the operation quality in response from the entity.

Comparing the operation data to the evaluation metrics may include: (i) identifying a first type of the operation data, (ii) identifying an evaluation metric of the evaluation metrics corresponding to the first type of the operation data, the first evaluation metric indicating a schema for interpreting the measurement associated with the first type of the data, (iii) labeling the first type of the data based on how a measurement associated with the first type of the data falls within the schema, (iv) repeating the previously described process for each remaining type of the operation data to obtain a set of labels, each label of the set of the labels corresponding to a type of the operation data, (v) generating the representations of the operation quality based on the set of the labels, and/or (vi) other actions.

For example, a first representation of the operation quality may include a numerical operation quality score, the numerical operation quality score being based on a mathematical equation including a series of terms. Each term of the series of the terms may correspond to one of the types of the operation data. To obtain the numerical quality score, measurements corresponding to each type of the operation data may be converted to weights (e.g., based on a schema defining ranges of the measurements and weights corresponding to the ranges). The weight may be utilized to indicate an extent to which each type of the data contributes to the overall numerical operation quality score.

At operation 304, the representations of the operation quality of the data pipeline are evaluated for compliance with operation quality goals for the data pipeline to obtain a degree of alignment with a use of the data pipeline.

Evaluating the representations of the operation quality of the data pipeline may include: (i) obtaining the operation quality goals for the data pipeline, (ii) comparing the representation of the operation quality to the operation quality goals to obtain a delta between the representations of the operation quality and the operation quality goals, and/or (iii) obtaining a degree of alignment with a use of the data pipeline based on the delta.

Evaluating the representations of the operation quality of the data pipeline may also include: (i) providing the operation quality goals and the representations of the operation quality to another entity responsible for obtaining the degree of alignment, and/or (ii) other methods.

For example, the representations of the operation quality may include a numerical operation quality score as previously described. The operation quality goals may, therefore, include a threshold for the operation quality score. The delta may be obtained by generating a difference between the numerical operation quality score and a numerical representation of the threshold. The delta may be used as the degree of alignment and/or may be compared to any schema for assigning degrees of alignment based on deltas to obtain the degree of alignment.

The representations of the operation quality of the data pipeline may also include a comparison between how the data pipeline would operate without mechanisms (e.g., to self-heal and/or self-correct) to address misalignments and/or other undesirable operation of the data pipeline. For example, the operation of the data pipeline without these mechanisms may be simulated, and similar operation quality for the simulated data pipeline may be computed. The operation quality of the data pipeline under both scenarios may then be compared to one another to quantify improvement in outcomes in the operation of the data pipeline based on these mechanisms.

At operation 306, an action set is performed based on the degree of alignment with the use of the data pipeline to improve a quality of data processing services provided by the data pipeline. Performing the action set may include: (i) obtaining a report based on a degree of alignment with the use of the data pipeline, (ii) distributing the report to one or more persons to obtain user feedback, (iii) selecting one or more actions to be performed based on the user feedback, (iv) providing the data processing services using the updated data pipeline, and/or (v) other actions.

Obtaining the report may include: (i) reading the report from storage, (ii) receiving the report as a transmission (e.g., over a communication system) from another entity, (iii) generating the report, and/or (iv) other methods.

Generating the report may include: (i) obtaining the degree of alignment and/or any other data (e.g., the representations of the operation quality, etc.), (ii) populating a document with the degree of alignment, other data, and/or a description of the degree of alignment, and/or (iii) treating the document as the report. Generating the report may also include populating a graphical user interface (GUI) using the degree of alignment and/or the other data, the GUI being accessible by entities participating in and/or receiving the data processing services.

Distributing the report may include: (i) providing the report over a communication system (e.g., in the form of a message, a notification in an application on a device, etc.), (ii) providing access credentials to the recipient of the report, the access credentials allowing the recipient to access a database storing the report, (iii) providing a notification that the report is accessible via the GUI, (iv) providing the report to another entity responsible for distributing the report, and/or (v) other methods.

Obtaining the user feedback may include receiving a response to the report, the response indicating whether the degree of alignment indicated by the report is considered acceptable (and/or any additional feedback responsive to the degree of alignment in light of the intended use for the data pipeline) by the user (e.g., the recipient of the report). The user feedback may be obtained: (i) directly from the user (e.g., in the form of a message), (ii) from another entity, (iii) from storage, and/or (iv) via other methods.

Selecting the one or more actions to be performed may include: (i) feeding the user feedback into an inference model to identify the one or more actions intended to be responsive to the user feedback, (ii) performing an action lookup process using the user feedback (and/or any identifier based on the user feedback) as a key for an action lookup table and obtaining the one or more actions as the output from the action lookup table. (iii) obtaining the one or more actions from another entity responsible for selecting the one or more actions, and/or (iv) other methods.

Providing the data processing services may include: (i) providing data supplied by the data pipeline to another entity (e.g., a downstream consumer), (ii) feeding the data supplied by the data pipeline into an inference model to generate inferences based on the data usable to perform various services, (iii) storing the data supplied by the data pipeline in storage, and/or (iv) other methods.

The method may end following operation 306.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system.

However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft R, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:

monitoring the data pipeline based on monitoring criteria to obtain operation data of the data pipeline that is indicative of a performance of the data pipeline, the operation data being based at least on operation data of an application programming interface (API) that initiated transfer of data through the data pipeline in response to a data retrieval requests obtained by the API, the operation data of the API being indicative of a performance of the API;

obtaining representations of operation quality of the data pipeline by comparing the operation data with one or more evaluation metrics, the one or more evaluation metrics comprising at least a predefined uptime duration threshold for the data pipeline;

evaluating the representations of the operation quality of the data pipeline for compliance with operation quality goals for the data pipeline to obtain a degree of alignment with a use of the data pipeline; and performing an action set based on the degree of alignment with the use of the data pipeline to improve a quality of data processing services provided by the data pipeline.

2. The method of claim 1, wherein the monitoring criteria specifies at least the following as monitored quantities:

an actual uptime of the data pipeline;

occurrences of misalignments of the data pipeline, the occurrences of the misalignments of the data pipeline being based on the operation data of the API; and portions of data managed by the data pipeline that are impacted by the occurrences of the misalignments.

3. The method of claim 2, wherein the monitoring criteria further specifies at least the following as additional monitored quantities:
re-alignments of the misalignments of the data pipeline; and
durations of time between the misalignments of the data pipeline and the re-alignments of the misalignments.

4. The method of claim 3, wherein the one or more evaluation metrics further comprise:
a threshold number of occurrences for the misalignments of the data pipeline; and
a value ascribed by a downstream consumer to the portions of the data.

5. The method of claim 4, wherein the one or more evaluation metrics further specify at least the following additional metrics:
a value ascribed by the downstream consumer for the durations of time.

6. The method of claim 2, wherein the misalignments of the data pipeline occur when the API outputs, in response to the data retrieval request obtained by the API, data different from requested data specified in the data retrieval request.

7. The method of claim 1, wherein performing the action set comprises:
obtaining a report based on the degree of alignment with the use of the data pipeline;
distributing the report to one or more persons to obtain user feedback; and
selecting one or more actions to be performed based on the user feedback.

8. The method of claim 7, wherein the one or more actions, when performed, modify operation of the data pipeline to obtain an updated data pipeline.

9. The method of claim 1, wherein the data pipeline is established in response to the API attempting to retrieve data specified in the data retrieval request from a data source in which the data is stored.

10. The method of claim 1, wherein the operation data of the API comprises a data retrieval result of the data retrieval request being processed by the API.

11. A non-transitory machine-readable medium having instructions stored therein, which when executed by a processor, cause the processor to perform operations for managing a data pipeline, the operations comprising:
monitoring the data pipeline based on monitoring criteria to obtain operation data of the data pipeline that is indicative of a performance of the data pipeline, the operation data being based at least on operation data of an application programming interface (API) that initiated transfer of data through the data pipeline in response to a data retrieval requests obtained by the API, the operation data of the API being indicative of a performance of the API;
obtaining representations of operation quality of the data pipeline by comparing the operation data with one or more evaluation metrics, the one or more evaluation metrics comprising at least a predefined uptime duration threshold for the data pipeline;
evaluating the representations of the operation quality of the data pipeline for compliance with operation quality goals for the data pipeline to obtain a degree of alignment with a use of the data pipeline; and
performing an action set based on the degree of alignment with the use of the data pipeline to improve a quality of data processing services provided by the data pipeline.

12. The non-transitory machine-readable medium of claim 11, wherein the monitoring criteria specifies at least the following as monitored quantities:
an actual uptime of the data pipeline;
occurrences of misalignments of the data pipeline, the occurrences of the misalignments of the data pipeline being based on the operation data of the API; and
portions of data managed by the data pipeline that are impacted by the occurrences of the misalignments.

13. The non-transitory machine-readable medium of claim 12, wherein the monitoring criteria further specifies at least the following as additional monitored quantities:
re-alignments of the misalignments of the data pipeline; and
durations of time between the misalignments of the data pipeline and the re-alignments of the misalignments.

14. The non-transitory machine-readable medium of claim 13, wherein the one or more evaluation metrics further comprise:
a threshold number of occurrences for the misalignments of the data pipeline; and
a value ascribed by a downstream consumer to the portions of the data.

15. The non-transitory machine-readable medium of claim 14, wherein the one or more evaluation metrics further specify at least the following additional metrics:
a value ascribed by the downstream consumer for the durations of time.

16. A data processing system, comprising:
a processor; and
a memory coupled to the processor to store instructions, which when executed by the processor, cause the processor to perform operations for managing a data pipeline, the operations comprising:
monitoring the data pipeline based on monitoring criteria to obtain operation data of the data pipeline that is indicative of a performance of the data pipeline, the operation data being based at least on operation data of an application programming interface (API) that initiated transfer of data through the data pipeline in response to a data retrieval requests obtained by the API, the operation data of the API being indicative of a performance of the API;
obtaining representations of operation quality of the data pipeline by comparing the operation data with one or more evaluation metrics, the one or more evaluation metrics comprising at least a predefined uptime duration threshold for the data pipeline;
evaluating the representations of the operation quality of the data pipeline for compliance with operation quality goals for the data pipeline to obtain a degree of alignment with a use of the data pipeline; and
performing an action set based on the degree of alignment with the use of the data pipeline to improve a quality of data processing services provided by the data pipeline.

17. The data processing system of claim 16, wherein the monitoring criteria specifies at least the following as monitored quantities:
an actual uptime of the data pipeline;
occurrences of misalignments of the data pipeline, the occurrences of the misalignments of the data pipeline being based on the operation data of the API; and
portions of data managed by the data pipeline that are impacted by the occurrences of the misalignments.

18. The data processing system of claim 17, wherein the monitoring criteria further specifies at least the following as additional monitored quantities:
- re-alignments of the misalignments of the data pipeline; and
- durations of time between the misalignments of the data pipeline and the re-alignments of the misalignments.

19. The data processing system of claim 18, wherein the one or more evaluation metrics further comprise:
- a threshold number of occurrences for the misalignments of the data pipeline; and
- a value ascribed by a downstream consumer to the portions of the data.

20. The data processing system of claim 19, wherein the one or more evaluation metrics further specify at least the following additional metrics:
- a value ascribed by the downstream consumer for the durations of time.

* * * * *

UNITED STATES PATENT AND TRADEMARK OFFICE
CERTIFICATE OF CORRECTION

| | | |
|---|---|---|
| PATENT NO. | : 12,242,447 B2 | Page 1 of 1 |
| APPLICATION NO. | : 18/343925 | |
| DATED | : March 4, 2025 | |
| INVENTOR(S) | : Ofir Ezrielev, Hanna Yehuda and Kristen Jeanne Walsh | |

It is certified that error appears in the above-identified patent and that said Letters Patent is hereby corrected as shown below:

In the Claims

Claim 1, Column 16, Lines 47, the sentence "a data retrieval requests" should instead be -- a data retrieval request --.

Claim 11, Column 17, Lines 53, the sentence "a data retrieval requests" should instead be -- a data retrieval request --.

Claim 16, Column 18, Lines 43, the sentence "a data retrieval requests" should instead be -- a data retrieval request --.

Signed and Sealed this
Seventeenth Day of June, 2025

Coke Morgan Stewart
*Acting Director of the United States Patent and Trademark Office*